(12) United States Patent
Wei et al.

(10) Patent No.: US 7,321,581 B2
(45) Date of Patent: Jan. 22, 2008

(54) METHOD OF DOUBLE WEIGHTING PARALLEL INTERFERENCE CANCELLATION

(75) Inventors: Limei Wei, Shenzhen (CN); Guolin Wang, Shenzhen (CN); Yu Jin, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 622 days.

(21) Appl. No.: 10/492,096

(22) PCT Filed: Oct. 9, 2002

(86) PCT No.: PCT/CN02/00711

§ 371 (c)(1),
(2), (4) Date: Apr. 8, 2004

(87) PCT Pub. No.: WO03/032545

PCT Pub. Date: Apr. 17, 2003

(65) Prior Publication Data

US 2004/0246927 A1    Dec. 9, 2004

(30) Foreign Application Priority Data

Oct. 9, 2001  (CN) ............................. 01 1 35527

(51) Int. Cl.
*H04B 7/216* (2006.01)
(52) U.S. Cl. ...................... 370/342; 375/144
(58) Field of Classification Search ............. 370/335, 370/342, 441; 375/144, 147, 148
See application file for complete search history.

(56) References Cited

U.S. PATENT DOCUMENTS 5,644,592 A * 7/1997 Divsalar et al. ............ 375/147
6,741,634 B1 * 5/2004 Kim et al. .................. 375/144
6,931,052 B2 * 8/2005 Fuller et al. ................ 375/144

FOREIGN PATENT DOCUMENTS

| CN | 1357988 | 7/2002 |
|---|---|---|
| EP | 0980149 | 2/2000 |
| EP | 0984576 | 3/2000 |
| EP | 1063778 | 12/2000 |
| WO | 0156183 | 8/2001 |

OTHER PUBLICATIONS

International Search Report for PCT/CN02/00711, mailed Dec. 12, 2002.

* cited by examiner

*Primary Examiner*—Lee Nguyen

(57) ABSTRACT

A method for double weighting parallel interference cancellation in CDMA mobile communication system, integrates ideas of both partial weighting method and weighting method based on Bayes rule. When making a decision on each symbol of the user, calculating reliability coefficient of a decision result on the symbol of the user according to the weighting algorithm based on Bayes rule; weighting regenerated signal of the symbol of the user with the reliability coefficient. During process of MAI estimating and removing, obtaining the MAI on the expected user from weighted regenerated signal of other users in chip level; and then setting a weight value, weighting the MAI with the weight value. Finally, removing weighted MAI from received signal, which means partially removing MAI produced by other users on the expected user. At the same time, the present invention also discloses a double weighting PIC method with simplified algorithm, which transfers weighting in chip level to weighting in symbol level, replacing a Hyperbolic tangent decision with a piecewise linear decision method or a look-up table method.

10 Claims, 4 Drawing Sheets

METHOD OF DOUBLE WEIGHTING PARALLEL INTERFERENCE CANCELLATION

FIELD OF THE TECHNOLOGY

The present invention generally relates to multiple user detection (MUD) technique in CDMA mobile communication system, and more particularly, to a method for double weighting parallel interference cancellation in CDMA system.

BACKGROUND OF THE INVENTION

Because of the advantages in great capacity, high service quality and excellent secrecy property, CDMA mobile communication system has become tendency of 3G mobile communication developments. Wherein, multiple user detection (MUD) is one kind of enhanced technique that can overcome limitations on CDMA system capacity produced by multiple access interference (MAI), in order to improve capacity and performance of the CDMA system.

With help of the information of multi-users, MUD technique can jointly detect signals from multi-users, in order to reduce influences of MAI on performance of the receiver, and heighten capacity of the system as much as possible. At present, MUD comprises maximum likelihood sequence detector that is the best detector, linear multiple user detector and interference cancellation multiple user detector that are second best detectors. Wherein, interference cancellation multiple user detection comprises the step of regarding signal from expected user as useful signal, removing and interference of other users from received signals to obtain signal of expected user, and then detecting the signal of the said expected user. In this way, performance of the system can be largely raised.

The interference cancellation multiple user detection can be classified into a serial interference cancellation (SIC) and a parallel interference cancellation (PIC). SIC sorts the user signals in power descending order and cancels interference in serial, the method has a better performance compared with single user detection but with longer time delay, and must sort signals of the users according to their power, which needs heavy calculation and is sensitive to the original signals estimation. PIC removes interference of other users in parallel from received signals, which has the advantages of short time delay and simpler calculation.

Prior PIC methods comprise traditional PIC method, partial PIC method and weighting PIC method that is based on Bayes rule.

Compared with single-user detection, the traditional PIC method can raise system performance in a large extent under high signal-to-noise ratio, but has a lower raise under low signal-to-noise ratio.

Being different from the traditional PIC method which removes MAI influence on expected users completely from received signals, the partial PIC method sets a weight value for each stage of interference cancellation to weight the MAI influence on the expected users, and partially removes the MAI during the interfere cancellation process. The traditional PIC method within Gaussian channel removes all the MAI on the expected users from the received signals, of course, the signal estimation on the expected users under this circumstance is biased; on the other hand, partial PIC method merely removes the MAI partially, which can correct estimation biases on the expected users, making decision results more reliable. At circumstance of low signal-to-noise ratio, partial PIC method has obviously better performance than that of the traditional PIC method.

The patent U.S. Pat. No. 5,418,814 discloses the weighting PIC method that is based on Bayes rule. Although being a weighting method, its weighting principle, which is a symbol-level weighting method that is based on a minimum mean of decision cost, is different from that of the partial PIC method. When creating a decision cost function, the method takes the minimum mean of decision cost as rule, to determine reliability coefficient of the decision result of each symbol, and to make symbol level weighting with the coefficient on the signals regenerated from the symbol. So only part of the interference produced by the symbol of the users is removed during the MAI eliminating process. The method has better performance than that of the traditional PIC method, especially at circumstance of low signal-to-noise ratio, and its improvement in performance is perfectly obvious.

Although both of the two methods above effectively improve performance of traditional PIC method under low signal-to-noise ratio, the extent is very limited.

SUMMARY OF THE INVENTION

It is an object to provide a method for double weighting parallel interference cancellation in CDMA communication system, which improves MUD performance without largely increasing its complexity, especially solves disadvantages of the prior art under circumstances with low signal-to-noise ratio.

A method for double weighting parallel interference cancellation in CDMA system according to the present invention comprises following steps of:

(a) Making a multi-path despreading, channel estimation and a multi-path combining on an input signal of a user by a RAKE receiver;

(b) Making a hard decision on a result of the multi-path combining;

(c) Calculating a reliability coefficient for a result of the hard decision of each symbol by the multi-path combining result and a value of the channel estimation;

(d) Regenerating a weighted signal in chip level for the user by the hard decision result, the reliability coefficient and the channel estimation value;

(e) Estimating a multiple access interference on each user by the weighted regenerated signal in chip level inputted in parallel of each user, and setting a weight value for a interference cancellation in different stages, weighting the multiple access interference on a expected user;

(f) Subtracting the weighted multiple access interference on the expected user from a base band signal of a received signal, and obtaining an output signal of the said expected user, which is also an input signal of the said expected user in the next stage of parallel interference cancellation.

Combining the partial PIC and the weighting PIC based on Bayes rule, bringing forward double weighting PIC method, the method disclosed according to the present invention has advantages of not only weighting algorithm based on Bayes rule, which has minimum decision cost in symbol level, but also partial weighting algorithm, which can make up the statistical signal estimation biases on users. What is more, the method enormously improves gains at circumstance of low signal-to-noise ratio without large increases on calculation workload comparing with the weighting PIC based on Bayes rule, and achieves a large improvement on performance of the system according to the present invention when comparing with partial weighting and weighting methods based on Bayes rule.

It is also a further object to provide a simplified double weighting PIC method, in order to reduce complexity of the algorithm while keeping performance of said double weighting PIC method unchanged.

A further object of the invention is to provide a double weighting PIC method with a simplified algorithm, which reduces complexity of the algorithm while keeping performance of said double weighting PIC method unchanged.

A double weighting PIC method with a simplified algorithm according to the present invention comprises following steps:

(a) Making a multi-path despreading, channel estimation and a multi-path combining on an input signal of a user by a RAKE receiver;

(b) Making a soft decision on a result of the multi-path combining and a value of the channel estimation;

(c) Setting a weight value for the soft decision in different stages, and weighting the soft decision in symbol level;

(d) Regenerating a weighted signal of the user in chip level by the weighted soft decision result and the channel estimation value;

(e) Estimating multiple access interference on each user by the weighted regenerated signal in chip level inputted in parallel of each user;

(f) Subtracting the multiple access interference on an expected user from a base band signal of a received signal, and obtaining an output signal of the expected user, which is also an input signal of the said expected user in the next stage of parallel interference cancellation.

The double weighting PIC method with the simplified algorithm according to the present invention, changing a chip level weighting into symbol level weighting, which can reduce complexity of the algorithm while keeping performance of said double weighting PIC method unchanged.

EMBODIMENTS OF THE INVENTION

The present invention will be described in more detail hereinafter with reference to the accompanying drawings and embodiments.

The method of the present invention integrates both partial weighting and the weighting based on Bayes rule. When decisions on each symbol of the user are made, a reliability coefficient of decision result of the symbol is calculated according to the weighting algorithm formula based on Bayes rule, and then regenerated signal of the symbol of the user is weighted with the reliability coefficient. During the MAI estimating and removing processes, the MAI on expected users produced by other users is got by the weighted regenerated signal of other users in chip level; after a weight value is set, the obtained MAI is weighted with the weight value. Finally, the weighted MAI is subtracted from received signals, which means partially removing the MAI on expected users produced by other users. Now above method is applied in each stage of PIC architecture.

Figure 1:
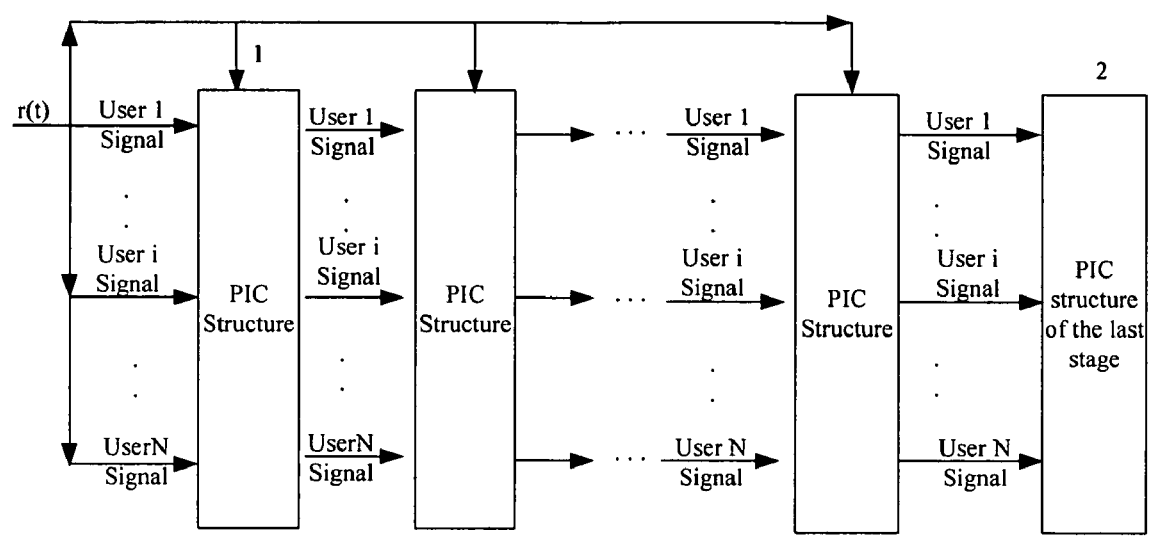
FIG. 1 is a schematic block diagram of multiple stages architecture in double weighting PIC receiver.

As shown in FIG. 1, multistage structure in double weighting PIC method is the same with that of traditional PIC method. The first stage PIC structure 1 takes base band signals r(t) of the received signal as input of each user for processing, and the obtained output of each user are input of each user in PIC structure of the next stage; after processing on input of each user in the second stage PIC structure, the obtained output become input of each user in PIC structure of the next stage; stage by stage in this way, after processing on input of each user in PIC structure 2 of the last stage, the obtained output from each user here will be the final result of the multistage PIC structure.

Figure 2:
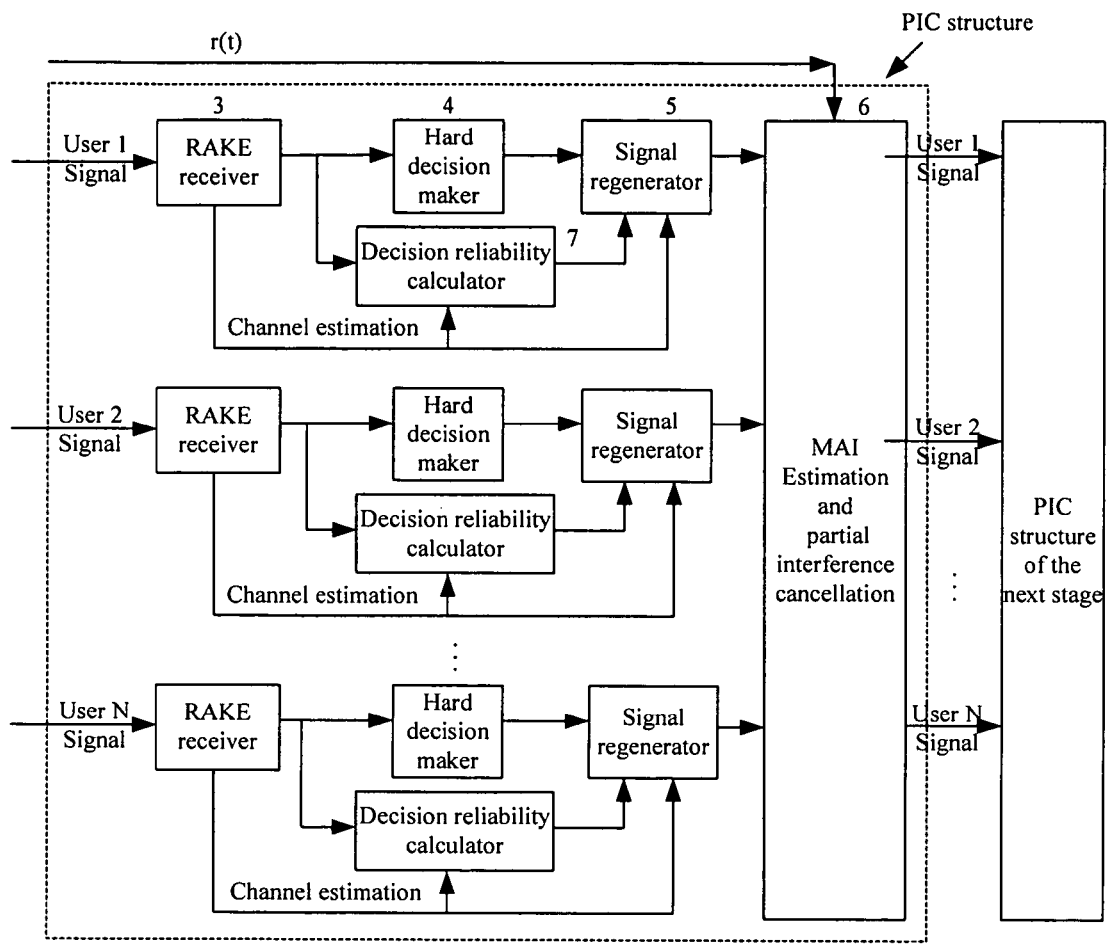
FIG. 2 is a schematic block diagram of PIC structure in double weighting PIC method.
Figure 3:
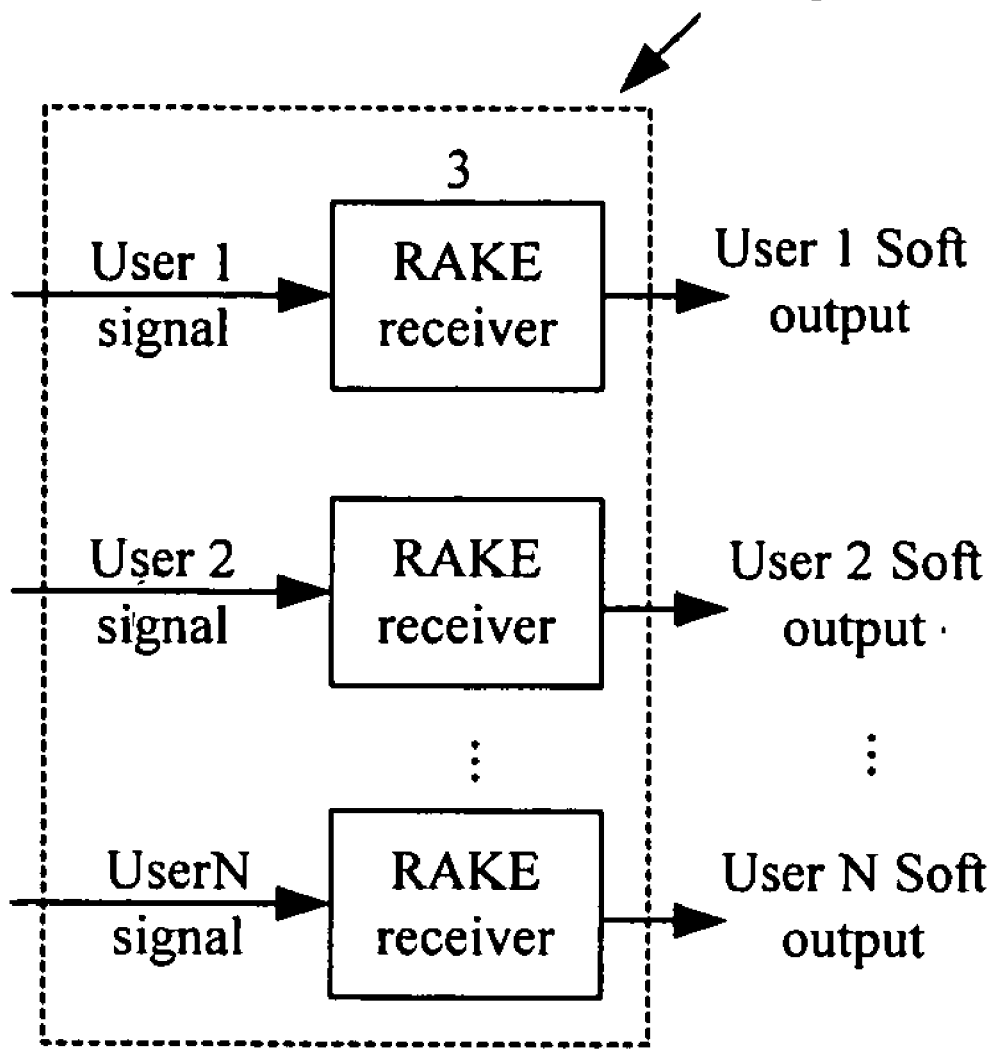
FIG. 3 is a schematic block diagram of PIC structure of the last stage.

As shown in FIG. 2, PIC structure in double weighting PIC method is the same with that of the weighting PIC method based on Bayes rule. PIC structure of the last stage of the method is same as that of the traditional PIC method, which is shown in FIG. 3.

Now refer to FIG. 1, which shows base band signals r(t) of the received signals enter the first stage PIC structure 1 in parallel mode. As shown in FIG. 2, input signal entering into PIC structure in parallel is transmitted to RAKE receiver 3 of each user respectively. RAKE receiver 3 despreads the input signal first, then makes channel estimation according to the result of despreading, and makes multi-path combining at last, then transmits the multi-path combining result to hard decision maker 4 and decision reliability calculator 7 simultaneously, and sends result of the channel estimation to decision reliability calculator 7 and signal regenerator 5 simultaneously. Hard decision maker 4 makes hard decision for the input, and transmits the result to signal regenerator 5.

In fading channel environment, base band signals r(t) of the received signal can be expressed as:

$$r(t) = \sum_{i=1}^{N} \sum_{l=1}^{L} a_{il} S_i(t - \tau_{il}) + Z(t) = \sum_{i=1}^{N} \sum_{l=1}^{L} a_{il} \sqrt{P_i} \, b_i(t - \tau_{il}) c_i(t - \tau_{il}) + Z(t) \qquad (1)$$

Where, r(t) refers to the base band signals of the received signals; $a_{il}$ refers to a channel fading value of the ith user in the lth path, L is a path number; $\tau_{il}$ refers to a delay of the ith user in the lth path; $S_i(t)$ refers to a outbound signal of user i, N refers to total users number; $P_i$ refers to a power of user i; $b_i(t)$ refers to a symbol flow of user $$i, b_i(t) = \sum_{m=-\infty}^{\infty} a_i^{(m)} p(t - mT_b), a_i^{(m)}$$

refers to the mth symbol of the ith user, p(t) refers to a signal pulse whose cycle is $T_b$, when there is no hindrance on the deducing process with the algorithm, set p(t) as rectangular pulse (when t∈[0, $T_b$], p(t)=1; when t∉[0, $T_b$], p(t)=0); $c_i(t)$ refers to a spread-spectrum code of user i; Z(t) refers to channel noise.

In the kth stage PIC structure, input of RAKE receiver 3 of user i is $$r_i^{(k)}(t). \qquad (1)$$

When $$k=1, r_i^{(1)}(t) = r(t).$$

After the RAKE receiver makes multi-path despreading on $r_i^{(k)}(t)$, and channel estimation according to the despreading result, multi-path combining is implemented. The lth path despreading result made by RAKE receiver of user i is:

$$y_i^{(m)(k)}(l) = \frac{1}{\sqrt{T_b}} \int_{(m-1)T_b+\tau_{il}}^{mT_b+\tau_{il}} \partial r_i^{(k)}(t) c_i^*(t-\tau_{il}) dt \qquad (2)$$

Where, l=1, . . . , L.

With the maximal ratio combining, the multi-path combining result made by RAKE receiver will be:

$$Y_i^{(m)(k)} = \text{Re}\{y_i^{(m)(k)}\} \qquad (3)$$

$$\text{Where, } y_i^{(m)(k)} = \sum_{l=1}^{L} A_{il}^* y_i^{(m)(k)}(l) \qquad (4)$$

$A_{il}$ is an estimation value of $a_{il}\sqrt{P_i}$, $a_{il}$ is a channel fading value in the lth path of the ith user, $P_i$ refers to a power of user i.

The above multi-path combining results of the RAKE receiver can be expressed as $$Y_i^{(m)(k)} = \mu_i a_i^{(m)} + n_i,$$

wherein, $n_i$ is Gaussian White Noise, which obeys normal distribution $N(0, \sigma_i^2)$, $\sigma^2$ is a noise power of $$n_i; a_i^{(m)}$$

refers to the mth symbol of user i, whose value is +1 or −1, $\mu_i$ is a real number relating to channel fading.

The decision result for the mth symbol of the ith user is:

$$\hat{a}_i^{(m)(k)} = sgn\{Y_i^{(m)(k)}\} \qquad (5)$$

The decision reliability calculator calculates the reliability coefficient of the decision result made by hard decision maker through two input signals, and transmits the reliability coefficient to signal regenerator 5. The reliability coefficient calculating formula of $\hat{a}_i^{(m)(k)}$ is expressed as:

$$f_i^{(m)(k)} = \tanh\left\{w \frac{\mu_i |Y_i^{(m)(k)}|}{\sigma_i^2}\right\} \qquad (6)$$

Where, w is a positive real number, which is used to make up errors in noise power estimation. The w values in different signal-to-noise ratios can be determined via experiments, wherein w=1 at higher signal-to-noise ratios.

After obtaining regenerated signals of the user from three input signals, the signal regenerator transmits the regenerated signals to device 6 for MAI estimation and partial interference cancellation. Weighted regenerated signal in chip level of user i is:

$$g_i^{(k)}(t) = \sum_{l=1}^{L} A_{il} \sum_{n=-\infty}^{\infty} f_i^{(n)(k)} \hat{a}_i^{(n)(k)} p(t-nT_b-\tau_{il}) c_i(t-\tau_{il}) \qquad (7)$$

Where, p(t) is a signal pulse whose cycle is $T_b$.

As shown in FIG. 2, the base band signals r(t) of the received signals are also transmitted into MAI estimation and partial interference cancellation device 6, which estimates MAI on each user according to the regenerated signals of each user inputted in parallel; the resulted signal after removing MAI on certain user from the base band signals r(t) of the received signals will be the output of the said user in the present stage PIC structure and the input of the said user in next stage of PIC structure.

In the kth stage PIC structure, MAI estimation of user i will be:

$$\hat{I}_i^{(k)} = \sum_{j=1, j \neq i}^{N} g_j^{(k)}(t) \qquad (8)$$

Suppose weight value of the kth stage PIC structure is $p^{(k)}$; the MAI from formula (8) can be weighted and then interference cancellation is made to obtain output $r_i^{(k+1)}(t)$ of user i in the kth stage PIC structure according to formula (9). $r_i^{(k+1)}(t)$ is the input of RAKE receiver of user i in PIC structure of the next stage.

$$r_i^{(k+1)}(t) = r(t) - p^{(k)} \hat{I}_i^{(k)} \qquad (9)$$

Different weight value $p^{(k)}$ can be set up for interference cancellations in different stages, and preferably set $p^{(1)} < p^{(2)} \ldots < p^{(k)} \ldots < p^{(S)}$, wherein k is the kth stage of the interference cancellation, S refers to a stage number of the interference cancellation.

Same process will be done for parallel input signals in PIC structure of the next stage. The process goes in this way stage by stage, and when it goes PIC structure of the last stage, the parallel input signals will be transmitted respectively into RAKE receivers 3 of each user. After multi-path dispreading, channel estimation and multi-path combining on the input signal made by RAKE receiver of the user, soft output of the user can be got. Said soft output of each user will be final result of each user in multistage PIC structure. In other words, multi-path dispreading process according to formula (2), and multi-path combining according to formula (3), (4) are made on the input signal of user i. And the soft output of user i obtained through multi-path combining will be final result of user i in the multistage PIC structure. In the receiver, soft output of the user will be transmitted to its decoder for decoding.

Integrating the partial PIC and the weighting PIC based on Bayes rule, the present invention provides the double weighting PIC method, which has advantages of not only the weighting algorithm based on Bayes rule, which has advantages of Minimum decision Cost in symbol level, but also advantages of the partial weighting algorithm, which can make up the statistical signal estimation biases on users. At the same time, the method has better performance than that of weighting PIC based on Bayes rule, which can improve gains at circumstance of signal-to-noise ratio without obvious increases in calculation workload and provide a largely improved performance compared with both partial weighting and weighting based on Bayes rule.

Through analysis on calculation formula of said double weighting PIC method, it is noticed that, formula (6) comprises the Hyperbolic tangent operation, which is hard to implemented with prior hardware, and needs to develop new arithmetic chips, so the cost is much higher; moreover, $$p^{(k)} \hat{I}_i^{(k)}$$

in formula (9) is chip level multiplication with heavy calculation workload.

Figure 4:
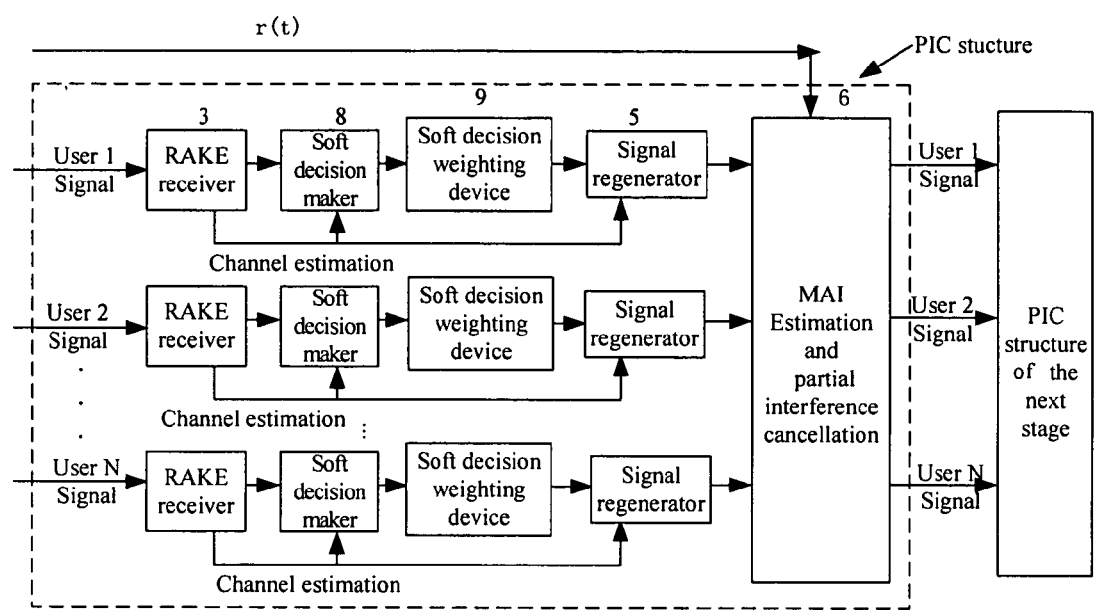
FIG. 4 is a schematic block diagram of PIC structure in simplified double weighting PIC method.

In order to solve above disadvantages, the present invention further provides a double weighting PIC method with simplified algorithm, whose multistage architecture is shown in FIG. 1, PIC structure of the simplified algorithm is illustrated in FIG. 4, PIC structure of the simplified algorithm in the last stage is shown in FIG. 3.

Here is one of embodiments with simplified algorithm according to the present invention:

As shown in FIG. 1, base band signals r(t) of the received signals enter in parallel to the first stage PIC structure 1 in FIG. 1. Referring to FIG. 4, the input signals r(t) entered the PIC structure are transmitted into RAKE receiver 3 of each user respectively. RAKE receiver 3 implements channel estimation after dispreading the input signal, and completes multi-path combining at least. RAKE receiver 3 transmits the multi-path combining result to soft decision maker 8, and then at the same time sends the channel estimation result to soft decision maker 8 and signal regenerator 5.

In the kth stage PIC structure, multi-path combining result of user i can be presented by:

$$Y_i^{(m)(k)} = \mu_i a_i^{(m)} + n_i \quad (10)$$

Where, $n_i$ is Gaussian White Noise, which is subject to normal distribution $$N(0, \sigma_i^2); a_i^{(m)}$$

is the mth symbol of user i, whose value is +1 or −1, $\mu_i$ is a real number relating to channel fading.

Soft decision maker 8 makes soft decision on the input signal, the soft decision on multi-path combining result in RAKE receiver of user i is $$\xi_i^{(m)(k)} = f_i^{(m)(k)} \hat{a}_i^{(m)(k)},$$

and $$f_i^{(m)(k)} \hat{a}_i^{(m)(k)}$$

satisfies:

$$f_i^{(m)(k)} \hat{a}_i^{(m)(k)} = \tanh\left\{ w \frac{\mu_i Y_i^{(m)(k)}}{\sigma_{i2}} \right\} \quad (11)$$

Where, $$\hat{a}_i^{(m)(k)}$$

is the decision result on the mth symbol of user i, $$\hat{a}_i^{(m)(k)} = sgn\{Y_i^{(m)(k)}\}, f_i^{(m)(k)}$$

is reliability coefficient of $$\hat{a}_i^{(m)(k)}.$$

Replacing the Hyberbolic tangent decision of said double weighting PIC method with a piecewise linear decision, setting a piecewise linear decision function as L(x), the method of replacing the Hyperbolic tangent decision with the piecewise linear decision is to apply the piecewise linear decision function L(x) to approach the Hyperbolic tangent function tanh(x). Deducting process of the piecewise linear decision function is as follows.

①. Define the piecewise linear decision function L(x)

Because the Hyperbolic tangent function is an odd function: tanh(−x)=−tanh(x);, define $$L(-x)=-L(x).$$

②. Determine a threshold value θ

The Hyperbolic tangent function has following characteristics: when x→∞, tanh(x)→1; Therefore, set the threshold value θ>0, when x>θ, set L(x)=1;

③. Determine a linear parameter Q

When 0≦x≦θ, equally divide field [0, θ] into Q small intervals, the qth small interval is $$[x_{q-1}, x_q], x_q = \frac{q\theta}{Q}, x_0 = 0, x_Q = \theta;$$

④. The expression of L(x) within the qth small interval is as following.

In the interval $[x_{q-1}, x_q]$, define L(x) as a line segment connecting between point $C_q$ and $D_q$. Wherein, coordinate of point $C_q$ is $Cq=(x_{q-1}, \tanh(x_{q-1}))$, coordinate of point $D_q$ is $Dq=(x_q, \tanh(x_q))$. And approximate the $\tanh(x)$ curve within the interval $[x_{q-1}, x_q]$ with said line segment $C_qD_q$. The equation of the line segment $C_qD_q$ is:

$$L_q(x) = \tanh(x_{q-1}) + \frac{\tanh(x_q) - \tanh(x_{q-1})}{x_q - x_{q-1}}(x - x_{q-1}) \quad (12)$$

⑤. With $L(-x)=-L(x)$, the expression of L(x) in the interval $[-x_q, -x_{q-}]$ is:

$$L(x)=-L_q(-x)$$

⑥. The expression of the piecewise linear decision function L(x) is:

$$L(x) = \begin{cases} 1, & x > \theta \\ L_q(x), & x \in [x_{q-1}, x_q] \\ -L_q(-x), & x \in [-x_q, -x_{q-1}] \\ -1, & x < -\theta \end{cases} \quad (13)$$

Soft decision maker 8 transmits the soft decision result to soft decision weighting device 9, which weights the soft decision result with formula (14), and sends the weighted result to signal regenerator 5. The weighting operation is symbol level.

$$\rho_i^{(m)(k)} = \xi_i^{(m)(k)} \cdot p^{(k)} \quad (14)$$

Signal regenerator 5 obtains the regenerated signal from two input signals according to following formula, and transmits the regenerated signal to MAI estimation and partial interference cancellation device 6, the weighted regenerated signal in chip level of user i can be expressed with following formula:

$$g_i^{(k)}(t) = \sum_{l=1}^{L} A_{il} \sum_{n=-\infty}^{\infty} \rho_i^{(n)(k)} \hat{a}_i^{(n)(k)} p(t - nT_b - \tau_{il}) c_i(t - \tau_{il}) \quad (15)$$

As shown in FIG. 4, base band signals r(t) of the received signals are also transmitted to MAI estimation and partial interference cancellation device 6, which estimates MAI on each user through the regenerated signal of each user inputted in parallel, in the kth stage PIC algorithm, estimation of MAI on user i is:

$$I_i^{(k)} = \sum_{j=1, j \neq i}^{N} g_j^{(k)}(t) \quad (16)$$

After MAI on user i is calculated, the method removes MAI on user i from base band signals r(t) of the received signals, and implements interference cancellation on MAI according to formula (17):

$$r_i^{(k+1)}(t) = r(t) - \hat{I}_i^{(k)} \quad (17)$$

$$r_i^{(k+1)}(t)$$

is the output signal of user i in the kth stage PIC structure, and the input signal into RAKE receiver of user i in PIC structure of the next stage.

The signal that is obtained after removing MAI on the user from base band signals r(t) of the received signals will become output signal of the said user in the present stage PIC structure, as well as input signal of the said user in next stage PIC structure. In the next stage of PIC structure, the parallel input signals will be processed in the same way. The operation is carried out stage by stage in this way; when being processed in PIC structure of the last stage, as shown in FIG. 3, the parallel input signals are transmitted into RAKE receiver 3 of each user separately, which implements despreading, channel estimation and multi-path combining on the input signal. The soft output from each user here will be the final result of the multistage PIC structure. In the receiver, the soft output of the user is transmitted to decoder of the said user for decoding.

Another embodiment of simplified algorithm according to the present invention is as following.

Now refer to FIG. 1. The base band signals r(t) of the received signals are transmitted into the first stage PIC structure 1 in parallel. As shown in FIG. 4, said input signals r(t) are respectively transmitted into RAKE receiver 3 of each user, which despreads the input signal first and makes channel estimation, and last implements multi-path combining. RAKE receiver 3 transmits the multi-path combining result to soft decision maker 8, and sends channel estimation result to soft decision maker 8 and signal regenerator 5 at the same time. In the kth stage PIC structure, the multi-path combining result of user i can be expressed as:

$$Y_i^{(m)(k)} = \mu_i a_i^{(m)} + n_i \quad (18)$$

$n_i$ is Gaussian White Noise, which is subject to normal distribution $$N(0, \sigma_i^2); a_i^{(m)}$$

is the mth symbol of user i, whose value is +1 or −1. $\mu_i$ is a real number that is related with channel fading.

Soft decision maker 8 makes soft decision on the input signal, the soft decision on the multi-path combining result of RAKE receiver of user i is $$\xi_i^{(m)(k)} = f_i^{(m)(k)} \hat{a}_i^{(m)(k)},$$

where $$f_i^{(m)(k)} \hat{a}_i^{(m)(k)}$$

satisfies following formula:

$$f_i^{(m)(k)} \hat{a}_i^{(m)(k)} = \tanh\left\{w \frac{\mu_i Y_i^{(m)(k)}}{\sigma_i^2}\right\} \quad (19)$$

Where, $$\hat{a}_i^{(m)(k)}$$

is a decision result of the mth symbol of user i, $$\hat{a}_i^{(m)(k)} = \text{sgn}\{Y_i^{(m)(k)}\}, f_i^{(m)(k)}$$

is a reliability coefficient of $$\hat{a}_i^{(m)(k)}.$$

When replacing the Hyperbolic tangent decision in the double weighting PIC method with a look-up table method, setting decision function of the look-up table method as T(x), the method of replacing the Hyperbolic tangent decision with the look-up table method is to approach the Hyperbolic tangent function tanh(x) with the decision function T(x) of the look-up table method, whose deducing process is as follows.

①. Define decision function T(x) of the look-up table method

Because the Hyperbolic tangent function is an odd function: tanh(−x)=−tanh(x), define T(−x)=−T(x);

②. Determine a threshold value θ

Because the Hyperbolic tangent function has the characteristics of: when x→∞, tanh(x)→1; set the threshold value θ>0 according to the present invention, when x>θ, set T(x)=1;

③. Determine a linear parameter Q

When 0≤x≤θ, divide the field [0, θ] into Q small intervals equally, where the qth small interval is $$[x_{q-1}, x_q], x_q = \frac{q\theta}{Q}, x_0 = 0, x_Q = \theta;$$

④. Expression of the T(x) in small interval q is as following.

In the small interval [$x_{q-1}$, $x_q$], set midpoint of the small interval as $$\frac{x_{q-1} + x_q}{2},$$

and define T(x) as follows:

$$T(x) = \tanh\left(\frac{x_{q-1} + x_q}{2}\right) \quad (20)$$

⑤. By means of T(−x)=−T(x), expression of the T(x) in the interval [−θ, 0] can be obtained.

⑥. Expression of the decision function T(x) in look-up table method is:

$$T(x) = \begin{cases} 1, x > \theta \\ \tanh\left(\frac{x_{q-1} + x_q}{2}\right), x \in [x_{q-1}, x_q] \\ -\tanh\left(\frac{x_{q-1} + x_q}{2}\right), x \in [-x_q, -x_{q-1}] \\ -1, x < -\theta \end{cases} \quad (21)$$

Soft decision maker 8 transmits the soft decision result to soft decision weighting device 9, which weights the soft decision result in symbol level with formula (22), and sends the weighted result to signal regenerator 5.

$$\rho_i^{(m)(k)} = \xi_i^{(m)(k)} \cdot p^{(k)} \quad (22)$$

According to the formula below, signal regenerator 5 obtains the regenerated signal from two input signals, and transmits the regenerated signals to MAI estimation and partial interference cancellation device 6; the weighted regenerated signal of user i in chip level can be expressed as:

$$g_i^{(k)}(t) = \sum_{l=1}^{L} A_{il} \sum_{n=-\infty}^{\infty} \rho_i^{(n)(k)} p(t - nT_b - \tau_{il}) c_i(t - \tau_{il}) \quad (23)$$

As shown in FIG. 4, base band signals r(t) of the received signals are also transmitted into MAI estimation and partial interference cancellation device 6, which estimates MAI on each user based on the regenerated signal inputted in parallel of each user, in the kth stage PIC algorithm, the estimations of MAI on user i is:

$$\hat{I}_i^{(k)} = \sum_{j=1, j \neq i}^{N} g_j^{(k)}(t) \quad (24)$$

After MAI on user i is calculated, the method removes MAI on user i from base band signals r(t) of the received signals, and implements interference cancellation on MAI according to formula (25):

$$r_i^{(k+1)}(t) = r(t) - \hat{I}_i^{(k)} \quad (25)$$

$$r_i^{(k+1)}(t)$$

is the output signal of user i in the kth stage PIC structure, and as well as input signal of RAKE receiver of user i in the next stage PIC structure.

The signal that is obtained after removing MAI on the user from base band signals r(t) of the received signals will become the output signal of the said user in the present stage PIC structure, as well as the input signal of the said user in next stage of PIC structure. In PIC structure of the next stage, the parallel input signals will be processed in the same way. The operation is carried out stage by stage in this way; when processed in PIC structure of the last stage, as shown in FIG. 3, the parallel input signals are transmitted into RAKE receiver 3 of each user separately, which implements despreading, channel estimation and multi-path combining on the input signal. The soft output from each user here will be the final result of the multistage PIC structure. In the receiver, the soft output of the user is transmitted to its decoder for decoding.

The invention claimed is:

1. A double weighting parallel interference cancellation method that can be used in a CDMA mobile communication system, comprises:
   (a) Making a multi-path despreading, channel estimation and a multi-path combining on an input signal of a user by a RAKE receiver;
   (b) Making a hard decision on a result of the multi-path combining;
   (c) Calculating a reliability coefficient for a result of the hard decision of each symbol by the multi-path combining result and a value of the channel estimation;
   (d) Regenerating a weighted signal in chip level for the user by the hard decision result, the reliability coefficient and the channel estimation value;
   (e) Estimating a multiple access interference on each user by the weighted regenerated signal in chip level inputted in parallel of each user, and setting a weight value for a interference cancellation in different stages, weighting the multiple access interference on a expected user;
   (f) Subtracting the weighted multiple access interference on the expected user from a base band signal of a received signal, and obtaining an output signal of the said expected user, which is also an input signal of the said expected user in the next stage parallel interference cancellation.

2. The double weighting parallel interference cancellation method according to claim 1, comprises, if the said input signal of user i in the kth stage parallel interference cancellation is expressed as $r_i^{(k)}(t)$,
   In step (a), calculating the said multi-path combining result of user i by a formula $$Y_i^{(m)(k)} = \text{Re}\{y_i^{(m)(k)}\},$$

which can be expressed as $$Y_i^{(m)(k)} = \mu_i a_i^{(m)} + n_i,$$

where, $n_i$ is a Gaussian White Noise, which is subject to a normal distribution of $$N(0, \sigma_i^2), \sigma^2$$

is a noise power of $$n_i, a_i^{(m)}$$

is the mth symbol of user i, whose value is +1 or −1, $\mu_i$ is a real number that is related with channel fading;
In step (b), calculating the said hard decision result of the mth symbol of user i by a formula $$\hat{a}_i^{(m)(k)} = sgn(Y_i^{(m)(k)});$$

In step (c), calculating the said reliability coefficient of the said decision result on the mth symbol of user i by $$f_i^{(m)(k)} = \tanh\left\{w\frac{\mu_i|Y_i^{(m)(k)}|}{\sigma_i^2}\right\},$$

where, w is a positive real number;
In step (d), calculating the said weighted regenerated signal of user i in chip level by a formula $$g_i^{(k)}(t) = \sum_{l=1}^{L} A_{il} \sum_{n=-\infty}^{\infty} f_i^{(n)(k)} \hat{a}_i^{(n)(k)} p(t - nT_b - \tau_{il}) c_i(t - \tau_{il}),$$

where, $A_{il}$ is a estimation value of $a_{il}\sqrt{P_i}$, $a_{il}$ refers to a channel fading value of user i in the path l, $p_i$ is a power of user i;
In step (e), calculating the said multiple access interference estimation of user i by a formula $$I_i^{(k)} = \sum_{j=1, j\neq i}^{N} g_j^{(k)}(t);$$

Assuming the said weight value of the kth stage parallel interference cancellation is $p^{(k)}$, then calculating the said output signal of user i in step (f) by a formula $$r_i^{(k+1)}(t) = r(t) - p^{(k)}\hat{I}_i^{(k)},$$

where, r(t) is the said base band signal of the said received signal.

3. The double weighting parallel interference cancellation method according to claim 2, wherein step (c) of calculating the said reliability coefficient of the said decision result on the mth symbol of user i comprises, replacing the said Hyperbolic tangent decision with a piecewise linear decision, which means approaching a Hyperbolic tangent function tanh(x) with a piecewise linear decision function L(x), a expression of the piecewise linear decision function L(x) is:

$$L(x) = \begin{cases} 1, x > \theta \\ L_q(x), x \in [x_{q-1}, x_q] \\ -L_q(-x), x \in [-x_q, -x_{q-1}] \\ -1, x < -\theta \end{cases}.$$

4. The double weighting parallel interference cancellation method according to claim 2, wherein step (c) of calculating the said reliability coefficient of the said decision result on the mth symbol of user i comprises, replacing the said Hyperbolic tangent decision with a look-up table method, which means approaching a Hyperbolic tangent function tanh(x) with a decision function T(x) of the look-up table method, a expression of the said decision function T(x) of the look-up table method is:

$$T(x) = \begin{cases} 1, x > \theta \\ \tanh\left(\frac{x_{q-1}+x_q}{2}\right), x \in [x_{q-1}, x_q] \\ -\tanh\left(\frac{x_{q-1}+x_q}{2}\right), x \in [-x_q, -x_{q-1}] \\ -1, x < -\theta \end{cases}.$$

5. The double weighting parallel interference cancellation method according to claim 1, wherein step (e) comprises, setting the different weight value $p^{(k)}$ for the interference cancellation in different stages, wherein $p^{(1)} < p^{(2)} \ldots < p^{(k)} \ldots < p^{(S)}$, where, k is the kth stage of the interference cancellation, and S is a stage number of the interference cancellation.

6. A double weighting parallel interference cancellation method that can be used in CDMA mobile communication system, comprises:
  (a) Making a multi-path despreading, channel estimation and a multi-path combining on an input signal of a user by a RAKE receiver;
  (b) Making a soft decision on a result of the multi-path combining and a value of the channel estimation;
  (c) Setting a weight value for the soft decision in different stages, and weighting the soft decision in symbol level;
  (d) Regenerating a weighted signal of the user in chip level by the weighted soft decision result and the channel estimation value;
  (e) Estimating multiple access interference on each user by the weighted regenerated signal in chip level inputted in parallel of each user;
  (f) Subtracting the multiple access interference on an expected user from a base band signal of a received signal, and obtaining an output signal of the expected user, which is also an input signal of the said expected user in the next stage of parallel interference cancellation.

7. The double weighting parallel interference cancellation method according to claim 6, comprises, if the said input signal of user i in the kth stage parallel interference cancellation is expressed as $$r_i^{(k)}(t),$$

In step (a), calculating the said multi-path combining result of user i by a formula $$Y_i^{(m)(k)} = \text{Re}\{y_i^{(m)(k)}\},$$

which can be expressed as $$Y_i^{(m)(k)} = \mu_i a_i^{(m)} + n_i,$$

where, $n_i$ is a Gaussian White Noise, which is subject to a normal distribution of $$N(0, \sigma_i^2), \sigma^2$$

is a noise power of $$n_i a_i^{(m)}$$

is the mth symbol of user i, whose value is +1 or −1, $\mu_i$ is a real number that is related with channel fading;

In step (b), expressing the said soft decision of the said multi-path combining result for user i as $$\xi_i^{(m)(k)} = f_i^{(m)(k)} \hat{a}_i^{(m)(k)},$$

calculating the said soft decision by a formula $$f_i^{(m)(k)} \hat{a}_i^{(m)(k)} = \tanh\left\{w \frac{\mu_i Y_i^{(m)(k)}}{\sigma_i^2}\right\},$$

where, W is a positive real number, $$\hat{a}_i^{(m)(k)}$$

is a soft decision result for the mth symbol of user $$i, f_i^{(m)(k)}$$

is a reliability coefficient of $$\hat{a}_i^{(m)(k)};$$

Assuming the said weight value of the said soft decision in the kth stage is $p^{(k)}$, and then in step (c) calculating the said weighted soft decision of user i in symbol level by a formula $$\rho_i^{(m)(k)} = \zeta_i^{(m)(k)} \cdot p^{(k)};$$

In step (d), calculating the said weighed regenerated signal in chip level of user i by a formula $$g_i^{(k)}(t) = \sum_{l=1}^{L} A_{il} \sum_{n=-\infty}^{\infty} \rho_i^{(n)(k)} \hat{a}_i^{(n)(k)} p(t - nT_b - \tau_{il}) c_i(t - \tau_{il}),$$

where, $A_{il}$ is a estimation value of $a_{il}\sqrt{P_i}$, $a_{il}$ refers to a channel fading value of user i in the path l, and $p_i$ is a power of user i;

In step (e), calculating the said multiple access interference on user i by a formula $$\hat{I}_i^{(k)} = \sum_{j=1, j \neq i}^{N} g_j^{(k)}(t);$$

In step (f), calculating the said output signal of user i by a formula $$r_i^{(k+1)}(t) = r(t) - \hat{I}_i^{(k)},$$

where, r(t) is the said base band signal of the said received signal.

8. The double weighting parallel interference cancellation method according to claim 7, wherein step (b) of making the said soft decision of the said multi-path combining result for user i comprises, replacing the said Hyperbolic tangent decision with a piecewise linear decision, which means approaching a Hyperbolic tangent function tanh(x) with a piecewise linear decision function L(x), a expression of the piecewise linear decision function L(x) is:

$$L(x) = \begin{cases} 1, x > \theta \\ L_q(x), x \in [x_{q-1}, x_q] \\ -L_q(-x), x \in [-x_q, -x_{q-1}] \\ -1, x < -\theta \end{cases}.$$

9. The double weighting parallel interference cancellation method according to claim 7, wherein step (b) of making the said soft decision of the said multi-path combining result for user i comprises, replacing the said Hyperbolic tangent decision with a look-up table method, which means approaching a Hyperbolic tangent function tanh(x) with a decision function T(x) of the look-up table method, a expression of the said decision function T(x) of the said look-up table method is:

$$T(x) = \begin{cases} 1, x > \theta \\ \tanh\left(\frac{x_{q-1} + x_q}{2}\right), x \in [x_{q-1}, x_q] \\ -\tanh\left(\frac{x_{q-1} + x_q}{2}\right), x \in [-x_q, x_{q-1}] \\ -1, x < \theta \end{cases}.$$

10. The double weighting parallel interference cancellation method according to claim 6, wherein step (c) comprises, setting the different weight value $p^{(k)}$ for the soft decision in different stages, wherein $p^{(1)} < p^{(2)} \ldots < p^{(k)} \ldots < p^{(S)}$, where, k is the kth stage of the interference cancellation, and S is a stage number of the interference cancellation.

* * * * *